United States Patent [19]
Brenan

[11] 3,922,769
[45] Dec. 2, 1975

[54] METHOD FOR MAKING COMPOSITE WIRE

[75] Inventor: Robert Brenan, Warren, Pa.

[73] Assignee: GTE Sylvania Incorporated, Stamford, Conn.

[22] Filed: June 7, 1974

[21] Appl. No.: 477,405

[52] U.S. Cl. .................. 29/420.5; 29/420; 29/624; 29/DIG. 31; 29/DIG. 47
[51] Int. Cl.² .......................................... B22F 3/24
[58] Field of Search ... 29/420, 420.5, 624, DIG. 31, 29/DIG. 47

[56] References Cited
UNITED STATES PATENTS

| | | | |
|---|---|---|---|
| 2,756,492 | 7/1956 | Pettibone | 29/420.5 |
| 2,888,740 | 6/1959 | Danis | 29/420.5 X |
| 3,168,399 | 2/1965 | Takahashi et al. | 29/420 X |
| 3,331,962 | 7/1967 | Kuhl | 29/420.5 X |
| 3,344,507 | 10/1967 | Green | 29/420.5 |
| 3,533,152 | 10/1970 | Gloor et al. | 29/420.5 |
| 3,631,583 | 1/1972 | Haller | 29/420.5 |

*Primary Examiner*—C. W. Lanham
*Assistant Examiner*—V. K. Rising
*Attorney, Agent, or Firm*—Norman J. O'Malley; Lawrence R. Fraley; Donald R. Castle

[57] ABSTRACT

A method for making a composite wire which comprises providing a tubular sheath consisting essentially of copper. The sheath is filled with a powdered metallic material dissimilar to copper which is compacted within the sheath. The sheath is then substantially sealed, subjected to a gas evacuation process, heated, and reduced utilizing an extruding step.

9 Claims, 6 Drawing Figures

METHOD FOR MAKING COMPOSITE WIRE

BACKGROUND OF THE INVENTION

This invention relates to wire manufacturing and more particularly to a method for forming a composite wire utilizing powdered metals. Even more particularly, this invention relates to composite wire manufacturing processes utilizing powdered metals wherein the finished product has an external layer consisting essentially of copper and an internal core portion consisting essentially of an alloyed metallic material dissimilar to copper.

Known established methods for producing composite metal wires having an external layer of copper and an internal core of a metal dissimilar to copper have included a variety of processes such as cladding, plating, high pressure rolling, etc. An example of one of these methods is illustrated in U.S. Pat. No. 3,389,455 wherein powdered metal cladding material is bonded to a centrally positioned moving solid core member. The bonding of the cladding material to the core is achieved by utilization of a pair of opposing rollers which exert a relatively high pressure against the moving product. A particular disadvantage of this and similar processes was that it was extremely difficult to completely remove the gaseous media built up in the hopper or similar powder supply and positioning chambers. Consequently, the formed wire was porous or similarly deformed within its external layer, resulting in a deficient end product.

Further problems of prior art techniques for producing copper layered wiring included the inability to provide a product which achieved absolute integrity both internally and externally as well as one which provided for controlled expansion in both axial and radial directions when the product was subjected to relatively high temperature. The latter described disadvantage proved particularly deleterious when the finished wire was utilized in glass sealing operations, a primary use for copper layered wiring.

It is believed therefore that a method for producing a composite wire having an external layer of copper and an internal core portion of an alloyed metallic material dissimilar to copper which would obviate the described disadvantages of prior art method would constitute an advancement in the art.

OBJECTS AND SUMMARY OF THE INVENTION

It is therefore a primary object of this invention to provide a method for making a composite wire which obviates known disadvantages of prior art methods.

It is a further object of this invention to provide such a method wherein the composite wire has an external layer of copper and an internal core portion of an alloyed metallic material dissimilar to copper.

In accordance with one aspect of this invention there is provided a method for producing a composite wire having an external layer consisting essentially of copper and a internal layer consisting essentially of an alloyed metallic material dissimilar to copper. The method comprises providing a tubular sheath member consisting essentially of copper, filling the sheath member with a powdered metallic material dissimilar to copper, compacting the powdered material within the sheath, and thereafter substantially sealing the sheath to form a composite billet. The method further comprises subjecting the billet to a gas evacuation step to substantially remove any gaseous medium located therein, heating the billet for an established time at a specified temperature, and then utilizing an extrusion process to form a composite wire having an external layer consisting essentially of copper and internal core portion consisting essentially of an alloyed metallic material dissimilar to copper.

BRIEF DESCRIPTION OF THE DRAWINGS S

FIGS. 1–6 illustrate the method in accordance with a preferred embodiment of the present invention.

DETAILED DESCRIPTION OF THE PREFERRED EMBODIMENTS

For a better understanding of the present invention, together with other and further objects, advantages and capabilities thereof, reference is made to the following disclosure and appended claims in connection with the above-described drawings.

Figure 1:
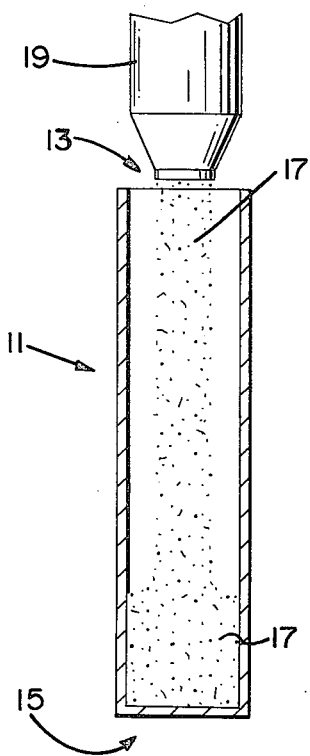

With particular reference to FIG. 1, there is illustrated a substantially elongated copper tubular sheath member 11 which has an open end 13 and a closed end 15. A typical size for sheath 11 when utilized with the present invention is about 20 feet in length with an outside diameter of from about 2.5 to about 3.5 inches. A desired wall thickness ranges from about 0.150 to about 0.200 inches. It is to be understood however that sheaths of several different dimensions can be successfully utilized and that the dimensions described are only provided as preferred illustrations and not meant to be restrictive in any manner to the present invention.

Sealed end 15 is shown as being formed integrally from the body of sheath 11. End 15 could also be sealed by the application of a copper end cap or similar item to a previous open end similar to end 13. Such an end cap could be affixed by known techniques such as welding.

In FIG. 1, elongated sheath 11 is illustrated as being filled through open end 13 with a powdered metallic material 17. Powdered material 17 is dispensed from a suitable supply means, illustrated as container 19. Powdered material 17 is of a metallic material dissimilar to copper and is preferably supplied to sheath 11 in unalloyed form. Alloyed powdered metals may also be successfully used with the present invention although the described form is preferred primarily as a cost expedience. A preferred material for powdered material 17 is a nickel-iron composition with the nickel comprising about 42% by weight of the total material. Other powdered materials which may be used include carbonsteels, nickel-steels, and aluminum.

While the method for filling sheath 11 is illustrated in FIG. 1 as simply of comprising a dispensing means 19, it is to be understood that sheath 11 may be filled by using other dispensing media. For example, a hydraulically actuated supply means could be utilized which operates in conjunction with a high pressure supply system. Such a system would serve to supply powdered material 17 under substantially high pressure, thus facilitating the filling of sheath 11.

Figure 2:
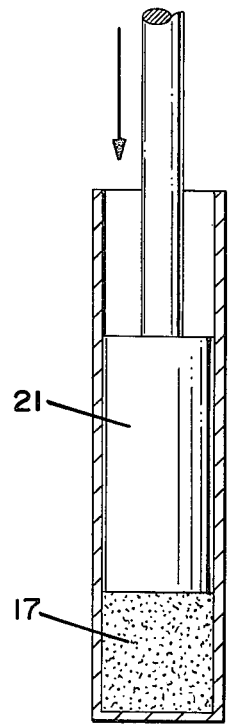
Figure 3:
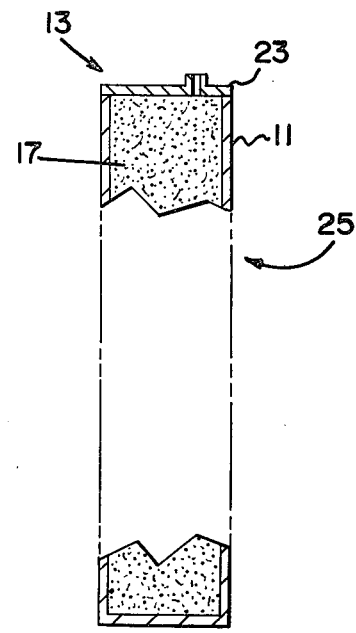

After sheath 11 has been filled to a predetermined level, a compacting means, illustrated as ram 21, is actuated to compress the powdered material within the elongated sheath. When using a ram as illustrated in FIG. 2, pressures within the range of from about 25,000 to about 50,000 pounds per square inch are preferred. Furthermore, compaction of material 17 within sheath 11 is preferably accomplished by supplying powdered material 17 in predetermined quantities between actuations of the described compaction means. That is, it is preferred to use a repeated process to achieve the filling of sheath 11 with a totally compacted powdered material. It is understood that when filling tubular sheaths of substantially less length than those described, the sheath member may be completely filled and thus only compacted once.

After the described filling and compacting measures, an end cap member 23 is fixedly mounted on the previous opened end 13 of sheath 11 thus substantially sealing this end. End cap 23 is preferably of copper composition and is sealed to an end 13 utilizing known methods such as welding. Sealing of sheath 11 with end cap 23 results in the formation of a substantially elongated composite billet member 25 which in turn has an established outside diameter substantially the same as that of sheath 11.

Figure 4:
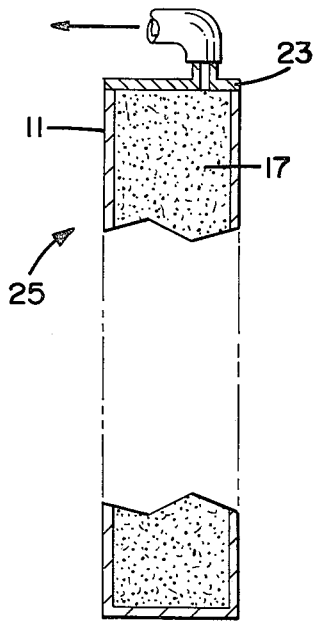
Figure 5:

As illustrated in FIG. 4, composite billet number 25 is next subjected to a gas evacuation process to substantially evacuate billet 25 of any gaseous medium located therein. The described evacuation is achieved to substantially eliminate possible subsequent oxidation of the particles of metal powder within composition billet 25 at the elevated temperatures to which the billet is to be subsequently subjected. With billet 25 maintained in an evacuated state, the portion of the end cap 23 which provided a means for the described gas escapement is sealed off so as to produce a substantially air tight billet member. This sealing off, such as may be accomplished utilizing crimping or welding or similar techniques, is illustrated in FIG. 5.

Figure 6:
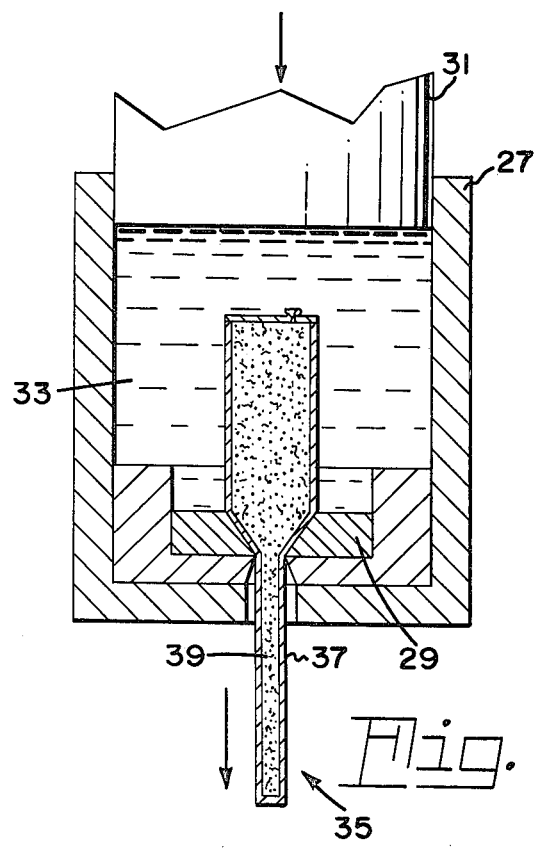

The next step in the preferred embodiment of the present invention includes heating the sealed composition billet member 25 to a predetermined temperature for an established time period. This heating operation may be achieved by placing billet 25 in a suitable furnace or similar device and then preferably heating the billet to a temperature within the range of from about 1,000° F to about 1,800° F for a time period of from about 3 hours to about 5 hours. After the described heating step, billet member 25 is subjected to an extrusion process to reduce the described outside diameter of the composite billet. This extrusion process results in a composite wire being formed which will have an external layer consisting essentially of an established percentage by weight copper with an internal core portion consisting of an alloyed metallic material dissimilar to copper. The preferred extrusion process for achieving the aforedescribed formation is to utilize a hot hydrostatic extrusion process. As illustrated in FIG. 6, such a process includes an extrusion chamber 27, an extrusion die 29, and an upper ram or pressure exerting member 31. Hydrostatic extrusion devices are well established in the art and therefore further description is not considered necessary. Composite billet 25 is positioned within the extrusion device and an established amount of pressure is applied. When utilizing the described hot hydrostatic process, extrusion pressures within the range of from about 200,000 to about 400,000 pounds per square inch are utilized. As can be appreciated, the described process also incorporates the use of a hot fluid medium 33 located within the extrusion device. A known fluid medium particularly useful in hot hydrostatic extrusion is oil, glass, or similar lubricating media. When using glass, it is preferred to heat this medium to approximately 600°C. When doing so, an extrusion pressure of approximately 200,000 psi is satisfactory to achieve the desired results. Application of the described pressures and temperatures and utilization of the described hydrostatic extrusion process results in the formation of an extruded wire product 35 having an external layer 37 of copper and an internal core portion 39 of a material dissimilar to copper. Utilizing the afore-mentioned extrusion process also results in the previously compacted powdered metals becoming alloyed as well as attaining approximately 100% densification. This results in the core portion being in a simulated wrought condition and thus highly satisfactory for the purposes desired. When using the described method, extrusion ratios within the range of from about 100:1 to about 200:1 are preferred resulting in a reduction of from the before described 2.5 to about 3.5 inch diameter for the composite billet to about 0.25 inch diameter for the extruded wire 35.

Another preferred method for forming wire 35 is the utilization of hot isostatic pressure to form the desired product. It is preferred however when utilizing the described dimensions for the composite billet member 25 to use the described process, that being hot hydrostatic extrusion.

Thus a method has been shown for making a composite wire having an external layer consisting essentially of an established percentage by weight of copper and an internal core portion consisting essentially of an alloyed metallic material dissimilar to copper. When using the dimensional requirements for sheath number 25 as described, the extruded end product will consist essentially of from about 21 to about 25 percent by weight copper. This is primarily because of a main intended use for the finished product — that being to provide a lead-in electrical connection for glass encased electrical devices. One particular example of such devices are diodes wherein the lead-in wire is sealed within the glass casing. It has been determined that composite wires having a 42% nickel-iron composition for the core and a copper sheath from 21 to 25% by weight of the entire product seal best within the afore-mentioned (soft) glass. As a cost factor, it may be also be desirable to maintain the same percentages of copper when bonding copper to cores of other material as provided, although this percentage ratio is not intended to restrict the overall concept as disclosed herein.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for making a composite wire having an external layer consisting essentially of an established percentage by weight of copper and an internal core portion consisting of essentially of an alloyed metallic material dissimilar to copper, said method comprising:
   providing a substantially elongated tubular sheath member consisting essentially of copper, said sheath member having a sealed end and an open end;
   filling said tubular sheath to an established level with a powdered metallic material dissimilar to copper, said filling being accomplished through said open end;
   compacting said powdered metallic material within said tubular sheath;

substantially sealing said open end of said tubular sheath member to form a substantially elongated composite billet member having an established outside diameter substantially similar to the outside diameter of said tubular sheath member;

subjecting said composite billet member to a gas evacuation process to substantially evacuate said billet member of any gaseous medium located therein;

heating said composite billet member to a predetermined temperature for an established time period; and hot hydrostatically extruding said composite billet member to reduce said established outside diameter of said composite billet member to form a composite wire having an external layer consisting essentially of an established percentage by weight copper and an internal core portion of approximately 100% densification consisting essentially of an alloyed metallic material dissimilar to copper, said alloyed metallic material in a simulated wrought condition.

2. The method according to claim 1 wherein said powdered metallic material consists essentially of nickel and iron powders.

3. The method according to claim 2 wherein said nickle powder comprises about 42 percent by weight of said powdered metallic material.

4. The method according to claim 1 wherein said compacting of said powdered metallic material within said substantially elongated tubular sheath member is accomplished utilizing compacting pressures within the range of from about 25,000 to about 50,000 pounds per square inch.

5. The method according to claim 1 wherein said established diameter of said composite billet member is within the range of from about 2.5 inches to about 3.5 inches.

6. The method according to claim 1 wherein said predetermined temperature for heating said composite billet member is within the range of from about 1,000° to about 1,800°F.

7. The method according to claim 6 wherein said established time period for heating said composite billet member is within the range of from about 3 hours to about 5 hours.

8. The method according to claim 1 wherein said hot hydrostatic extrusion process utilizes an extrusion ratio within the range of from about 100:1 to about 200:1.

9. The method according to claim 8 wherein said hot hydrostatic extrusion process utilizes extrusion pressures within the range of from about 200,000 to about 400,000 pounds per square inch.

* * * * *